No. 863,517. PATENTED AUG. 13, 1907.
F. G. DUSTIN.
GOVERNOR CONTROLLED SAFETY SHUTTER FOR MOVING PICTURE MACHINES.
APPLICATION FILED MAY 1, 1907.
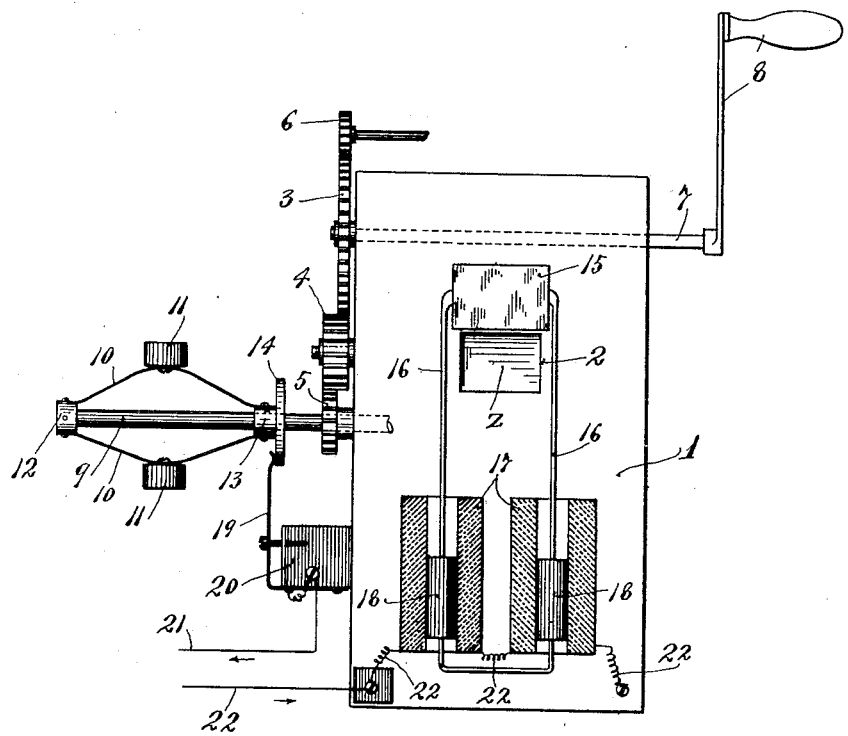
Witnesses.
A. H. Opsahl.
L. L. Simpson
Inventor.
Fred. G. Dustin
By his Attorneys.
Williamson Merchant

UNITED STATES PATENT OFFICE.

FRED G. DUSTIN, OF MINNEAPOLIS, MINNESOTA.

GOVERNOR-CONTROLLED SAFETY-SHUTTER FOR MOVING-PICTURE MACHINES.

No. 863,517.  Specification of Letters Patent.  Patented Aug. 13, 1907.

Application filed May 1, 1907. Serial No. 371,257.

*To all whom it may concern:*

Be it known that I, FRED G. DUSTIN, a citizen of the United States, residing at Minneapolis, in the county of Hennepin and State of Minnesota, have invented certain new and useful Improvements in Governor-Controlled Safety-Shutters for Moving-Picture Machines; and I do hereby declare the following to be a full, clear, and exact description of the invention, such as will enable others skilled in the art to which it appertains to make and use the same.

My invention relates to moving picture machines, and has for its object to provide a governor controlled safety shutter for automatically cutting off from the film the intense light rays that are used to project the picture from the film. To the above ends the invention consists of the novel devices and combinations of devices hereinafter described and defined in the claims.

The films used in these moving picture machines are made of celluloid, which is a very combustible material. In the operation of the machine, the film is intermittently moved but is not caused to remain stationary for more than a very brief interval of approximately one-fifteenth of a second.

It is a well known fact to all persons familiar with the operation of moving picture machines that the projection of the picture from the film is produced by intense light which is concentrated or focused on the film through an exposure window in the inclosing case of the machine. This light is usually produced by an arc lamp, but sometimes the light is produced by an oxyhydrogen burner, calcium light or other source of intense light, but in all cases the concentrated rays produce intense heat on the film, so that if the film from any cause is held stationary for more than a very brief period of time, it will be ignited with disastrous results to the film and surrounding materials.

In accordance with my invention, I provide a so-called "safety shutter" which is interposed between the lamp or source of light and the film, and is adapted to be moved to and from a position in which it closes the so-called exposure window through which the concentrated light is projected onto the film; and I also provide a governor, and coöperating electro magnetic device whereby this safety shutter will be held in an inoperative or open position as long as the film feeding mechanism is operated at a predetermined required speed, but will be automatically moved into position to close the exposure window and thus cut off the concentrated rays of light from the film, whenever the said film feeding mechanism is stopped or drops below a predetermined speed. This arrangement makes it impossible for the film to be burned or damaged by the concentrated rays of light when, for one cause or another, the machine is accidentally or intentionally stopped, or the movement of the film temporarily or permanently interrupted.

The invention is illustrated in the single view of drawing, which view is chiefly in elevation, with some parts sectioned.

The numeral 1 indicates the case of the picture machine, the same having the usual exposure window 2 through which the concentrated rays of light from the arc lamp or other source (not shown) are concentrated or focused upon the film z. The numerals 3, 4, 5 and 6 indicate a train of gears suitably mounted on the case 1, and constituting parts of the usual film exposing mechanism. Such film exposing mechanism, as is well known, usually includes means for intermittently moving the film at a very high rate of speed, and means for intermittently actuating the exposure shutter, not shown, but which is usually located within the case 1. As shown, motion is imparted directly to the gear 3 by a transverse shaft 7 which is provided with an operating crank 8.

The numeral 9 indicates a governor shaft which, as shown, is driven from the gear 5 and is horizontally disposed but may, of course, be otherwise arranged. The centrifugal governor may, of course, take various forms, but as illustrated it involves a pair of light spring bars 10 having weights 11 secured to their intermediate portions and being secured at their outer ends to a fixed sleeve 12 on the outer end of said shaft 9, and at their inner ends to a sleeve 13 which is free to slide on the said shaft. This sleeve 13 carries a disk 14.

The construction so far described applies to both forms of the device illustrated in Figs. 1 and 2.

The numeral 15 indicates a safety shutter which in this arrangement is made in a single piece and is secured to the upper portion of a light rectangular metallic carrier 16, the vertical legs of which work axially through a pair of solenoids 17. As shown, these solenoids 17 are supported from one side of the case 1. To the vertical legs of the carrier 16 are secured soft iron cores 18 that work within and are subject to the solenoids 17.

The disk 14 which is carried by the governor sleeve 13 is adapted to be moved into and out of engagement with the relatively fixed contact 19 shown as adjustably secured to an insulating block 20 secured on one side of the case 1. The contact 19 is connected to a wire 21, and another wire 22 connects the two solenoids 17 directly or indirectly with the governor shaft 9 and, hence, with the movable disk 14 which also serves as one of the contact members. For the purposes of this case we may assume that this electrical connection between the wire 22 and shaft 9 is made through the metallic case 1 in which the said shaft 9 is journaled. The wires 21 and 22 must, of course, be connected to some suitable source of electrical energy. Usually they would form a shunt from a section of the rheostat which is used in connection with the arc lamp.

It is evident that when the governor shaft 9 is at rest or is dropped below a predetermined speed, the tension of the spring bars 10 will move the weights 11 toward the axis of the shaft, and thereby throw the contact disk 14 out of engagement with the contact 19 and thus break the circuit through the solenoids 17. When the solenoids 17 are thus deënergized by breaking of their circuit, gravity acting upon the frame 16, cores 18 and safety shutter 15 will cause the said parts to drop and thereby move the said shutter directly over the exposure window 2, thus closing the said window and cutting off the concentrated rays of light from the film. Of course, if desired a spring may be used to assist gravity in thus moving the safety shutter over the exposure window, or a spring alone might be relied upon to perform this function. It thus becomes evident that normally, or when the machine is out of action, the safety shutter 15 will be dropped or moved over the exposure window 2. When the exposure mechanism and the film feeding mechanism are in operation at or above the predetermined desired speed, the centrifugal force will cause the weights 11 to buckle the spring bars 10 and move the contact disk 14 into engagement with the coöperating fixed contact 19, thereby closing the circuit through the solenoids 17 and causing the said solenoids to act upon the cores 18 and thus raise and hold the safety shutter 15 in position above the exposure window 2.

What I claim is:

1. The combination with a moving picture machine, of a safety shutter movable to and from a position to cut off the rays of light from the film, a centrifugal governor arranged to be driven at a speed proportionate to the speed of the exposure controlling mechanism of said machine, and an electro-magnetic device controlling the movements of said shutter to and from operative position and itself controlled by said centrifugal governor, substantially as described.

2. The combination with a moving picture machine, of a safety shutter movable to and from a position to cut off the rays of light from the film, an electro-magnetic device controlling the movements of said shutter, and a centrifugal governor arranged to be driven at a speed proportionate to the speed of the exposure controlling mechanism of said machine and operative to open and close the circuit of said electro-magnetic device, the said mechanism being arranged to hold said shutter in an inoperative position when the exposure mechanism is moving at or above a predetermined speed, and to cause said shutter to move into an operative position and cut off the rays of light from the film when the speed of said exposure mechanism falls below a predetermined speed, substantially as described.

In testimony whereof I affix my signature in presence of two witnesses.

FRED G. DUSTIN.

Witnesses:
MALIE HOEL,
F. D. MERCHANT.